United States Patent
Suzuki et al.

(10) Patent No.: US 8,872,958 B2
(45) Date of Patent: *Oct. 28, 2014

(54) IMAGE DISPLAY DEVICE, IMAGE PICKUP APPARATUS, IMAGE DISPLAY CONTROL METHOD, AND PROGRAM

(75) Inventors: Yasufumi Suzuki, Tokyo (JP); Toru Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 13/187,876

(22) Filed: Jul. 21, 2011

(65) Prior Publication Data

US 2011/0273605 A1    Nov. 10, 2011

Related U.S. Application Data

(63) Continuation of application No. 12/117,988, filed on May 9, 2008, now Pat. No. 7,999,872.

(30) Foreign Application Priority Data

Jun. 28, 2007 (JP) ................................ 2007-171248

(51) Int. Cl.
  *H04N 5/222* (2006.01)
  *H04N 5/232* (2006.01)
(52) U.S. Cl.
  CPC ................... *H04N 5/23293* (2013.01)
  USPC ................. 348/333.11; 348/333.02
(58) Field of Classification Search
  CPC .................................................. H04N 5/23293
  USPC ............. 348/333.01, 333.02, 333.05, 333.11, 348/333.12
  See application file for complete search history.

(56) References Cited

U.S. PATENT DOCUMENTS

| 4,952,932 A | 8/1990 | Sugino et al. |
| 4,992,779 A | 2/1991 | Sugino et al. |
| 6,208,331 B1 | 3/2001 | Singh et al. |
| 6,992,661 B2 | 1/2006 | Ikehata |
| 7,349,021 B2 | 3/2008 | Okada |

(Continued)

FOREIGN PATENT DOCUMENTS

| CN | 1577383 A | 2/2005 |
| CN | 1912819 A | 2/2007 |

(Continued)

OTHER PUBLICATIONS

Office Action issued Sep. 11, 2012 in Japanese Patent Application No. 2009-165079.

(Continued)

*Primary Examiner* — Tuan Ho
(74) *Attorney, Agent, or Firm* — Oblon, Spivak, McClelland, Maier & Neustadt, L.L.P.

(57) ABSTRACT

An image display device includes a display unit configured to display at least an image and an icon relating to a predetermined setting, a touch panel which allows input of operations, and on which a predetermined inhibited area is set, and a control unit configured to perform control so that, after the control unit sets the predetermined inhibited area, when an operation has been input by the touch panel, the control unit determines whether or not the operation has been input within the predetermined inhibited area, and, in a case where the operation has been input within the predetermined inhibited area, by erasing the icon displayed by the display unit, a user is allowed to recognize that an unintended operation has been input within the predetermined inhibited area.

19 Claims, 8 Drawing Sheets

(56) References Cited

U.S. PATENT DOCUMENTS

| | | |
|---|---|---|
| 7,564,448 B2 | 7/2009 | Yi |
| 2005/0017957 A1 | 1/2005 | Yi |
| 2005/0052432 A1 | 3/2005 | Kraus et al. |
| 2009/0007020 A1 | 1/2009 | Suzuki et al. |
| 2010/0214465 A1 | 8/2010 | Suzuki et al. |

FOREIGN PATENT DOCUMENTS

| | | |
|---|---|---|
| JP | 9-282134 | 10/1997 |
| JP | 2005-39582 | 2/2005 |
| JP | 2006-139615 | 6/2006 |
| JP | 2009-9424 A | 1/2009 |

OTHER PUBLICATIONS

Office Action issued Aug. 25, 2011, in Japanese Patent Application No. 2009-165079.

U.S. Appl. No. 13/869,602, filed Apr. 24, 2013, Suzuki et al.

Combined Chinese Office Action and Search Report issued Jan. 6, 2014, in Chinese Patent Application No. 201210009106.9 with English translation.

IMAGE DISPLAY DEVICE, IMAGE PICKUP APPARATUS, IMAGE DISPLAY CONTROL METHOD, AND PROGRAM

CROSS REFERENCES TO RELATED APPLICATIONS

This application is a continuation of and is based upon and claims the benefit of priority under 35 U.S.C. §120 for U.S. Ser. No. 12/117,988, filed May 9, 2008, and claims the benefit of priority under 35 U.S.C. §119 from Japanese Patent Application No. JP 2007-171248, filed Jun. 28, 2007, the entire contents of each which are incorporated herein by reference.

BACKGROUND OF THE INVENTION

1. Field of the Invention

The present invention relates to image display devices for displaying, for example, images and icons concerning various settings, etc., and, in particular, to an image display device, an image pickup apparatus, an image display control method, and a program that prevent unintended setting and unintended operation with an operation input unit such as a touch panel.

2. Description of the Related Art

Image pickup apparatuses of the related art, such as digital still cameras and digital video cameras, have liquid crystal panels such as liquid crystal displays. The image pickup apparatuses can also display not only picked-up images but also predetermined icons concerning various settings. In addition, nowadays, there is an image pickup apparatus including an operation input unit such as a touch panel. By tapping any position on the touch panel, a predetermined operation can be input. In this case, in the image pickup apparatus, the touch panel and a liquid crystal panel constitute a touch screen.

As described above, in the case of an apparatus that can perform various types of setting by using, for example, an operation input unit such as a touch panel, how to solve a problem of unintended operation becomes an important issue.

In view of this issue, Japanese Unexamined Patent Application Publication No. 2005-039582 discloses a technology in which, when a displacement of a display panel occurs within a predetermined time for timing of operating a touch-panel operation button, such a state is determined to be unintended operation and a resultant action is negated, whereby, in a case where an operation on an operation button is unintentionally performed when performing a display-panel-angle adjusting operation, action based on the operation is negated and an image pickup apparatus is restored to a state prior to the unintended operation. According to the technology, even in the case of unintentionally operating an operation button when tilting a display panel which has operation buttons thereon and which is provided on an image pickup apparatus body so as to be tilted, a resultant malfunction can be prevented and an appropriate operating state can be ensured.

SUMMARY OF THE INVENTION

In the above-described example of the related art, by tapping various types of icons displayed on the touch panel, desired settings can be performed. However, in a case such as when a targeted icon is tapped by a user, with the touch panel unknowingly touched by a user's finger, there is a possibility of an unintended setting or operation.

In this regard, the technology, disclosed in Japanese Unexamined Patent Application Publication No. 2005-039582, relating to the image pickup apparatus, determines whether or not the unintended operation has been performed on the basis of a relationship with the displacement of the display panel. However, the disclosed technology does not detect and does not prevent an unintended input to the touch screen regardless of the displacement of the display panel.

It is desirable to prevent a mistake such as an unintended setting or operation in such a manner that, in a situation in which an unintended operation has been input by a user from an operation input unit such as a touch panel, the user is allowed to recognize the situation.

According to an embodiment of the present invention, there is provided an image display device including a display unit configured to display at least an image and an icon relating to a predetermined setting, a touch panel which allows input of operations, and on which a predetermined inhibited area is set, and a control unit configured to perform control so that, after the control unit sets the predetermined inhibited area, when an operation has been input by using the touch panel, the control unit determines whether or not the operation has been input within the predetermined inhibited area, and, in a case where the operation has been input within the predetermined inhibited area, by erasing the icon displayed by the display unit, a user is allowed to recognize that an unintended operation has been input within the predetermined inhibited area.

Therefore, when the operation has been input by the touch panel, in a case where the operation has been input within the inhibited area, the control unit detects the status as unintended input operation. By erasing the icon displayed by the display unit, a user is allowed to recognize the unintended input operation.

The control unit may control the display unit to erase the displayed icon and to display a predetermined alert.

According to another embodiment of the present invention, there is provided an image pickup apparatus including an image pickup unit configured to obtain an image signal by picking up an image of a subject, a display unit configured to display at least a picked-up image based on the image signal and an icon relating to a predetermined setting, a touch panel which allows input of operations, and on which a predetermined inhibited area is set, a control unit configured to perform control so that, after the control unit sets the predetermined inhibited area, when an operation has been input by using the touch panel, the control unit determines whether or not the operation has been input within the predetermined inhibited area, and, in a case where the operation has been input within the predetermined inhibited area, by erasing the icon displayed by the display unit, a user is allowed to recognize that an unintended operation has been input within the predetermined inhibited area.

Therefore, when an operation has been input by using the touch panel, in a case where the operation has been input within the inhibited area, the control unit detects the status as unintended input operation. By erasing the displayed icon relating to the predetermined setting, a user is allowed to recognize the unintended input operation.

The control unit may control the display unit to erase the displayed icon and to display a predetermined alert.

According to another embodiment of the present invention, there is provided an image display method including the steps of: displaying at least a picked-up image and an icon relating to a predetermined setting, and performing control so that, after an inhibited area is set on a touch panel, when an operation has been input by using the touch panel, it is determined whether or not the operation has been input within the inhibited area, and, in a case where the operation has been input within the inhibited area, the displayed icon is erased to allow a user to recognize that unintended operation has been input within the inhibited area.

Therefore, when the operation has been input by the touch panel, in a case where the operation has been input within the inhibited area, the control unit detects the status as unintended input operation. By erasing the icon displayed by the display unit, a user is allowed to recognize the unintended input operation.

According to another embodiment of the present invention, there is provided a program for causing a computer to perform: an inhibited area setting function that sets an inhibited area on a touch panel, a main control function that, when an operation has been input by using the touch panel, determines whether or not the operation has been input within the inhibited area, and a display control function that, in a case where the operation has been input within the inhibited area, erases a displayed icon to allow a user to recognize that unintended operation has been input within the inhibited area.

Therefore, in software processing based a program, when an operation has been input by using the touch panel, in a case where the operation has been input within the inhibited area, the control unit detects the status as an unintended input operation. By erasing the displayed icon, a user is allowed to recognize the unintended input operation.

According to the embodiments of the present invention, an image display device, an image pickup apparatus, an image display control method, and a program can be provided in which, in a situation in which an unintended operation has been input by a user from an operation input unit such as a touch panel, a user is allowed to recognize the situation.

DESCRIPTION OF THE PREFERRED EMBODIMENTS

A best mode (hereinafter referred to simply as an "embodiment") for carrying out the present invention will be described bellow in detail with reference to the accompanying drawings.

Figure 1:
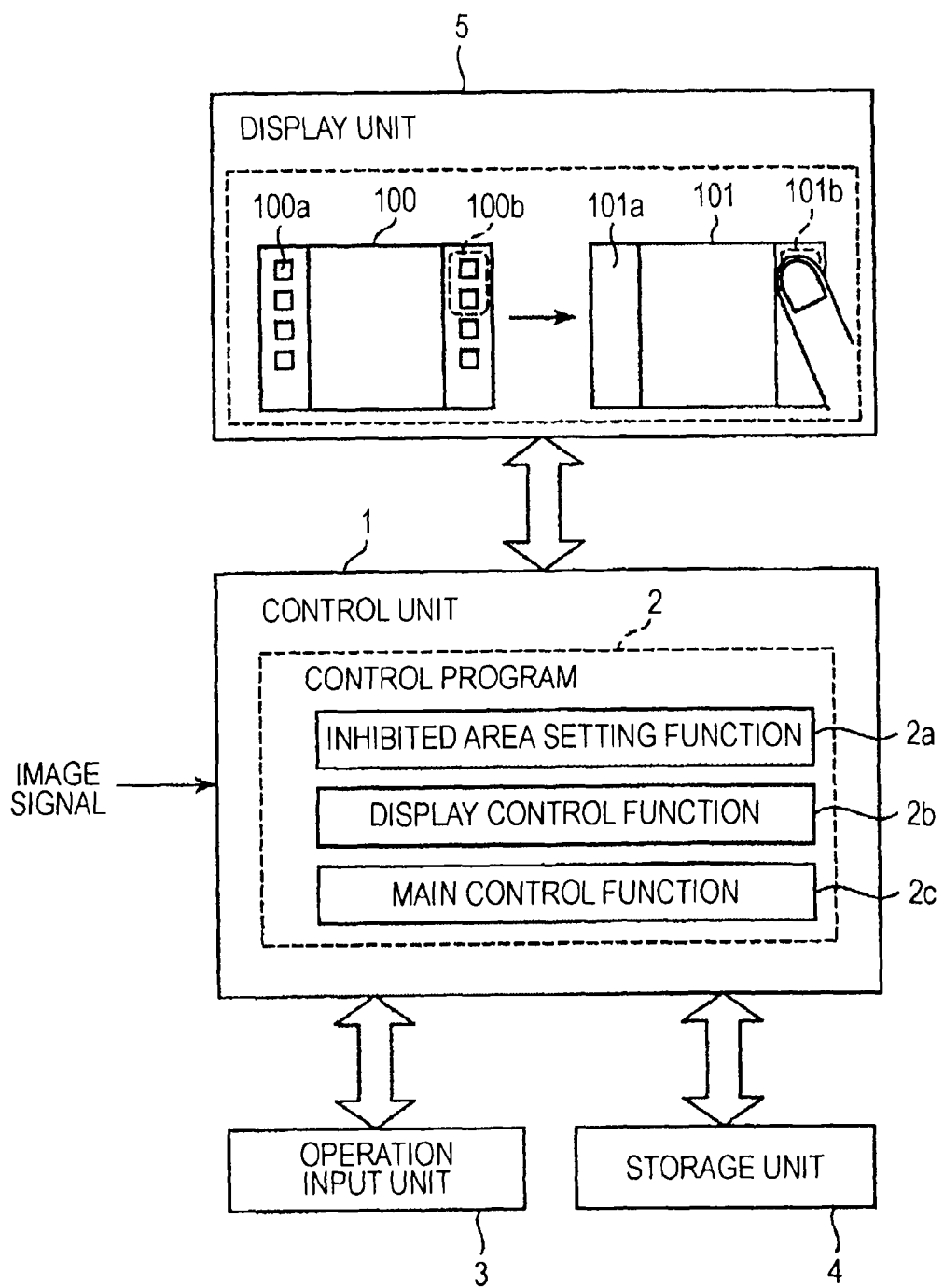
FIG. 1 is a conceptual diagram showing an image display device according to a first embodiment of the present invention.

FIG. 1 shows and illustrates the configuration of an image display device according to a first embodiment of the present invention.

As shown in FIG. 1, the image display device includes a control unit 1 for performing overall control, an operation input unit 3, a storage unit 4, and a display unit 5. The control unit 1 performs an inhibited area setting function 2a, a display control function 2b, and a main control function 2c by reading and executing a control program 2 stored in the storage unit 4. When the control unit 1 performs each of the inhibited area setting function 2a to the main control function 2c, the control unit 1 plays roles of an inhibited area setting unit, a display control unit, and a main control unit.

The control unit 1 uses the inhibited area setting function 2a to set a predetermined inhibited area in all regions of a touch panel serving as the operation input unit 3 in accordance with, for example, a photographing mode. The "inhibited area" is a predetermined region that executes display control (described later) in a case where an unintended operation has been input, such as when a user's finger touches the inhibited area.

Figure 2:
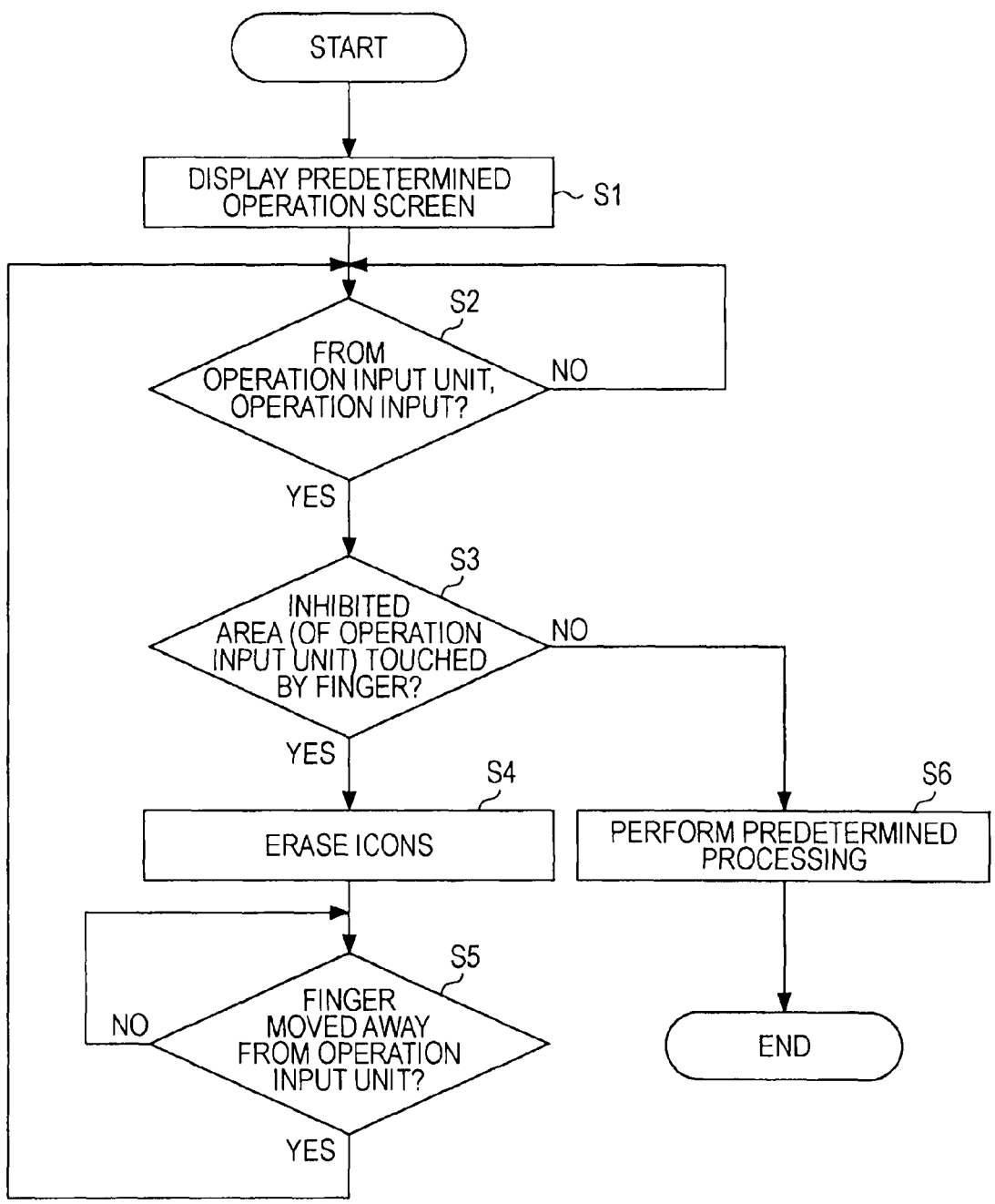
FIG. 2 is a detailed flowchart illustrating a characteristic process of the image display device according to the first embodiment of the present invention.

On the basis of the above-described setting, a characteristic process of the image display device according to the first embodiment will be described in detail with reference to the flowchart shown in FIG. 2.

First, in step S1, the control unit 1 displays a predetermined operation screen 100 by using the display control function 2b. On the operation screen 100, a plurality of icons 100a for directing various operations are displayed. A touch panel region corresponding to a region 100b on the operation screen 100 is set to be an inhibited area. In step S2, the control unit 1 uses the main control function 2c to determine whether or not an operation has been input via the operation input unit 3.

If, in step S2, the control unit 1 has determined that an operation has not been input, the control unit 1 is on standby until an operation is input. Alternatively, if, in step S2, the control unit 1 has determined that an operation has been input, in step S3, the control unit 1 determines whether or not the operation has been input in such a manner that a finger touches, for example, the inhibited area of the touch panel or the like as the operation input unit 3. In other words, in step S3, the control unit 1 detects whether the operation from the touch panel such as the operation input unit 3 has been input within the inhibited area, that is, whether the input operation is an unintended input.

If, in step S3, the control unit 1 has determined ("YES" in step S3) that the input operation is an unintended input operation based on a touch of the finger on the inhibited area (corresponding to the region 100b on the operation screen 100), in step S4, the control unit 1 uses the display control function 2b to erase icons displayed on the screen of the display unit 5. Specifically, in this case, as shown in FIG. 1, on a screen 101, all the icons in an icon display region 101a are erased since an unintended operation has been input on the basis of a touch of the finger on a region 101b serving as the inhibited area.

In step S5, the control unit 1 uses the main control function 2c to determine whether or not the finger has moved away. The control unit 1 is on standby until no unintended input operation is detected, that is, for example, until the user's finger moves away from the inhibited area. After that, if the control unit 1 has determined, with the main control function 2c, that the finger has moved away from the inhibited area ("YES" in step S5), the control unit 1 returns to step S1 and repeats the above-described processing. If, in step S3, the control unit 1 has determined ("NO" in step S3) that the input operation is not an unintended input operation based on a touch of the finger on the inhibited area (corresponding to the region 100b or 101b), in step S6, predetermined processing is performed on the basis of the input operation, and consecutive processing is finished.

The predetermined processing includes various types of processing such as change of image size setting, change of self-timer setting, and change of photographing mode setting. The type of processing is determined by the control unit 1 on the basis of a selected icon.

As described above, according to the image display device according to the first embodiment of the present invention, by erasing displayed icons in a situation in which an unintended operation has been input in such a manner that a finger touches the inhibited area such as the touch panel as the operation input unit 3, a user can be allowed to recognize the situation.

In addition, after the icons displayed on the screen are erased, needless to say, alert indicating "UNINTENDED OPERATION HAS BEEN INPUT" may be displayed.

Next, a second embodiment of the present invention will be described below.

Figure 3:
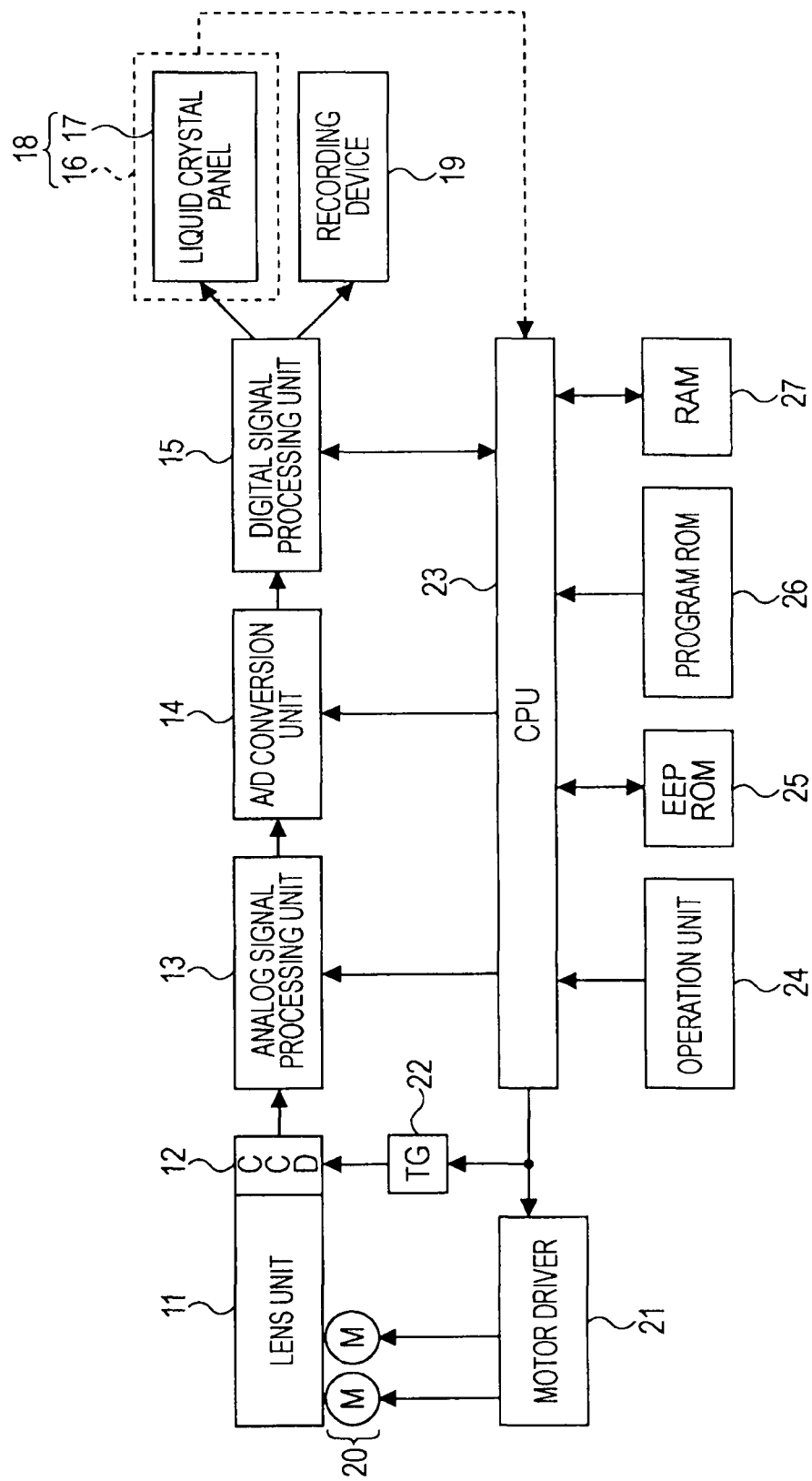
FIG. 3 is a block diagram showing the configuration of an image pickup apparatus according to a second embodiment of the present invention.

FIG. 3 shows and illustrates the configuration of an image pickup apparatus according to the second embodiment of the present invention.

This is such that the above-described image display device according to the first embodiment is applied to an image pickup apparatus such as a digital still camera or digital video camera. This image pickup apparatus will be described in detail.

As shown in FIG. 3, the image pickup apparatus according to the second embodiment includes a lens unit 11 including a photographing lens, a diaphragm, and a focus lens. On an optical path of incident light from a subject through the lens unit 11, an image pickup element 12, such as a charge-coupled device (CCD), is disposed. The image pickup element 12, an analog signal processing unit 13, an analog-to-digital (A/D) conversion unit 14, and a digital signal processing unit 15 are connected in series. The output of the digital signal processing unit 15 is electrically connected to the inputs of a liquid crystal panel 17 and a recording device 19.

An actuator 20 for adjusting the diaphragm included in the lens unit 11 and moving the focus lens included in the lens unit 11 is mechanically connected to the lens unit 11. The actuator 20 is connected to a motor driver 21 for controlling driving of the actuator 20.

The image pickup apparatus according to the second embodiment includes a central processing unit (CPU) 23. The CPU 23 is connected to the motor driver 21, a timing generator (TG) 22, an electronically erasable and programmable read only memory (EEPROM) 25, a program read-only memory (ROM) 26, a random access memory (RAM) 27, and a touch panel 16. The CPU 23 functions as a control unit, particularly as an inhibited area setting unit, a display control unit, a main control unit, etc., by reading and executing a control program stored in the program ROM 26.

The touch panel 16 and the liquid crystal panel 17 constitute a touch screen 18.

The recording device 19 is a removable recording medium such as a disc such as a digital versatile disc (DVD) or a semiconductor memory such as a memory card, and is removably mounted to an image pickup apparatus body. The EEPROM 25 is used to store various types of information set, data, etc., that are to be held even if power is turned off. The program ROM 26 is used to store a program that is executed by the CPU 23, and data necessary for executing the program.

The RAM 27 is used to temporarily store a necessary program and data when the RAM 27 is used as a work area in executing various types of processing.

In this configuration, by executing the program recorded in the EEPROM 25 to control each unit included in the image pickup apparatus, the CPU 23 executes predetermined processing in accordance with a signal from the digital signal processing unit 15 or a signal from an operation unit 24. The operation unit 24 is operated by the user and supplies the CPU 23 with a signal corresponding to the user's operation.

Specifically, when any position on the touch panel 16 is depressed in such a manner that a finger touches the position, that is, when a predetermined operation has been input by the user, the coordinates of the depressed position are detected by the touch panel 16, and a signal representing the coordinates is sent to the CPU 23. The CPU 23 acquires predetermined information corresponding to the coordinates and executes predetermined processing on the basis of the acquired information.

When the light from the subject is incident through the lens unit 11, the image pickup element 12 performs imaging on the light from the subject, performs photoelectric conversion, and outputs an analog image signal. At this time, the motor driver 21 drives the actuator 20 under the control of the CPU 23. The driving allows the lens unit 11 to be exposed from or accommodated in a housing of the image pickup apparatus. In addition, the driving performs adjustment of the diaphragm included in the lens unit 11 and movement of the focus lens included in the lens unit 11.

Under the control of the CPU 23, the timing generator 22 supplies a timing signal to the image pickup element 12. The timing signal controls an exposure time or the like of the image pickup element 12. The image pickup element 12 operates on the basis of the timing signal supplied from the timing generator 22, whereby the image pickup element 12 receives the incident light from the subject through the lens unit 11, performs photoelectric conversion, and supplies the analog signal processing unit 13 with an analog image signal as an electric signal according to the amount of the received light. Under the control of the CPU 23, the analog signal processing unit 13 performs analog signal processing (such as amplification) on the analog image signal supplied from the image pickup element 12, and supplies a resultant image signal to the A/D conversion unit 14.

After that, under the control of the CPU 23, the A/D conversion unit 14 performs A/D conversion on the analog image signal from the analog signal processing unit 13, and supplies a resultant digital image signal to the digital signal processing unit 15. Under the control of the CPU 23, the digital signal processing unit 15 performs digital signal processing, such as noise reduction, on the digital image signal from the A/D conversion unit 14, and supplies a resultant signal to the liquid crystal panel 17 for display.

The digital signal processing unit 15 compresses the digital image signal from the A/D conversion unit 14 on the basis of, for example, the JPEG (Joint Photographic Experts Group) standard, and supplies and records the resultant compressed digital image signal as data in the recording device 19.

In addition, the digital signal processing unit 15 decompresses the compressed image data recorded on the recording device 19, and supplies resultant image data to the liquid crystal panel 17. In other words, the digital signal processing unit 15 supplies image data from the A/D conversion unit 14 to the liquid crystal panel 17, whereby a so-called "through-the-lens-image" is displayed on the liquid crystal panel 17. In addition, under the control of the CPU 23, the digital signal processing unit 15 generates a focus frame (auto focus (AF)

frame) image for use in focus control, and supplies and displays the image on the liquid crystal panel 17.

After that, when the user depresses a shutter button that is included in the operation unit 24, the operation unit 24 supplies a release signal to the CPU 23. After the release signal is supplied to the CPU 23, the CPU 23 controls the digital signal processing unit 15 to compress the image data supplied from the A/D conversion unit 14 to the digital signal processing unit 15, and to record the compressed image data in the recording device 19.

The image pickup apparatus has an AF function. In the second embodiment, an AF frame is set on an image picked up by the image pickup element 12, and focus is controlled on the basis of an image in the AF frame. With the AF function, the AF frame can be set at any position on an image displayed on the liquid crystal panel 17. In addition, only by executing an operation on the touch panel 16 integrated with the liquid crystal panel 17, the position, size, etc., of the AF frame can be controlled. AF processing is realized in such a manner that the CPU 23 reads and executes the program in the program ROM 26.

What is characteristic is the following point. Specifically, the CPU 23 sets an inhibited area on the basis of a set mode by reading and executing the control program in the program ROM 26. When an operation has been input from the touch panel 16, the CPU 23 determines whether or not the operation is an unintended operation input in such a manner that a finger touches the inhibited area. If the operation is an unintended input operation, the CPU 23 erases icons displayed in an icon display region on the screen, inhibits various settings via icons, and allows the user to recognize that the unintended operation has been input. At this time, the CPU 23 erases the icons, and may allow the user to recognize the unintended input operation by displaying predetermined alert.

In addition, needless to say, icons which are displayed in an upper portion or the like in a display region of a picked-up image and which indicate various settings and situations may be erased.

Figure 4A:
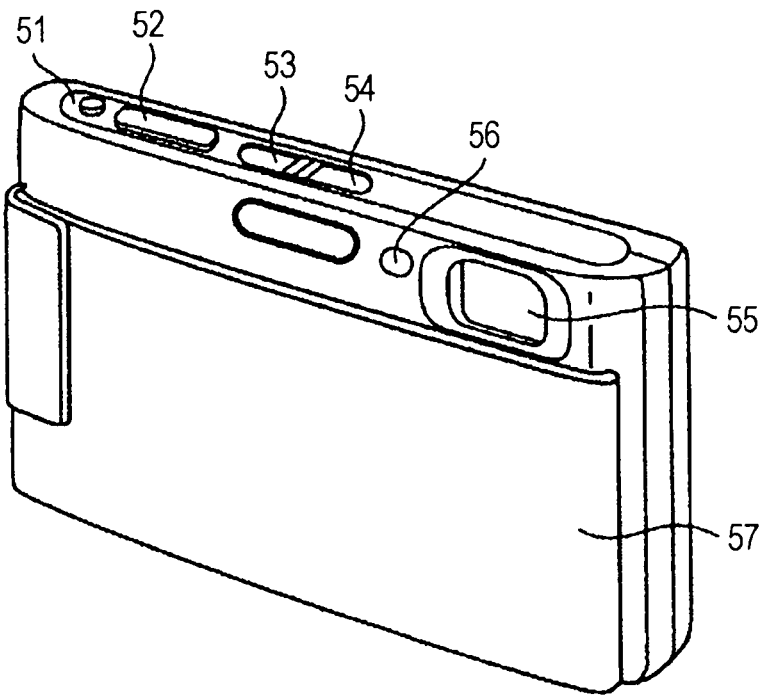
FIG. 4A is a front perspective view showing the image pickup apparatus according to the second embodiment of the present invention.
Figure 4B:
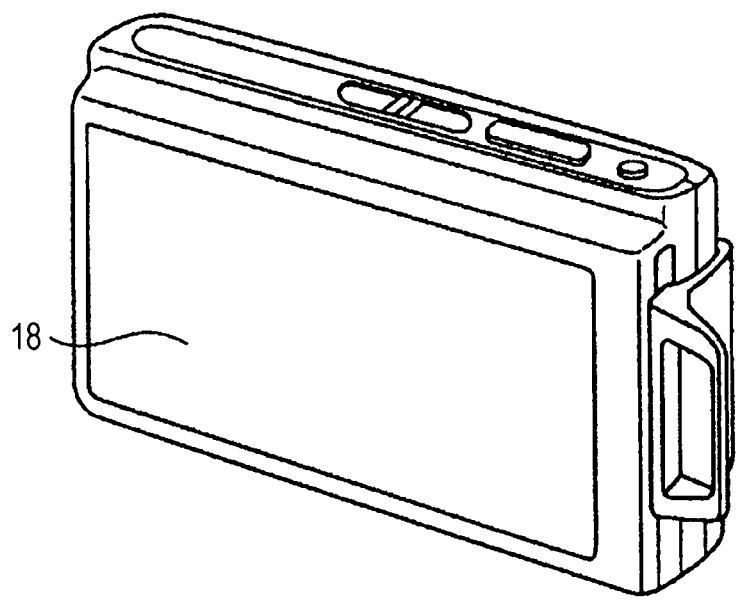
FIG. 4B is a rear perspective view of the image pickup apparatus according to the second embodiment of the present invention.

Next, FIGS. 4A and 4B show and illustrate an exterior of the image pickup apparatus according to the second embodiment of the present invention.

FIG. 4A is a front perspective view of the image pickup apparatus, and FIG. 4B is a rear perspective view of the image pickup apparatus.

A front face of the image pickup apparatus is covered with a lens cover 57. When the lens cover 57 is downwardly opened, a photographing lens 55 and an AF illuminator 56 that are included in the lens unit 11 are exposed. The AF illuminator 56 is also used as a self-timer lamp. On a top face of the image pickup apparatus, a zoom lever (TELE/WIDE) 51, a shutter button 52, a playback button 53, and a power button 54 are disposed. In addition, the touch screen 18 is provided on a rear face of the image pickup apparatus. The zoom lever 51, the shutter button 52, the playback button 53, and the power button 54 are included in the operation unit 24.

Figure 5:
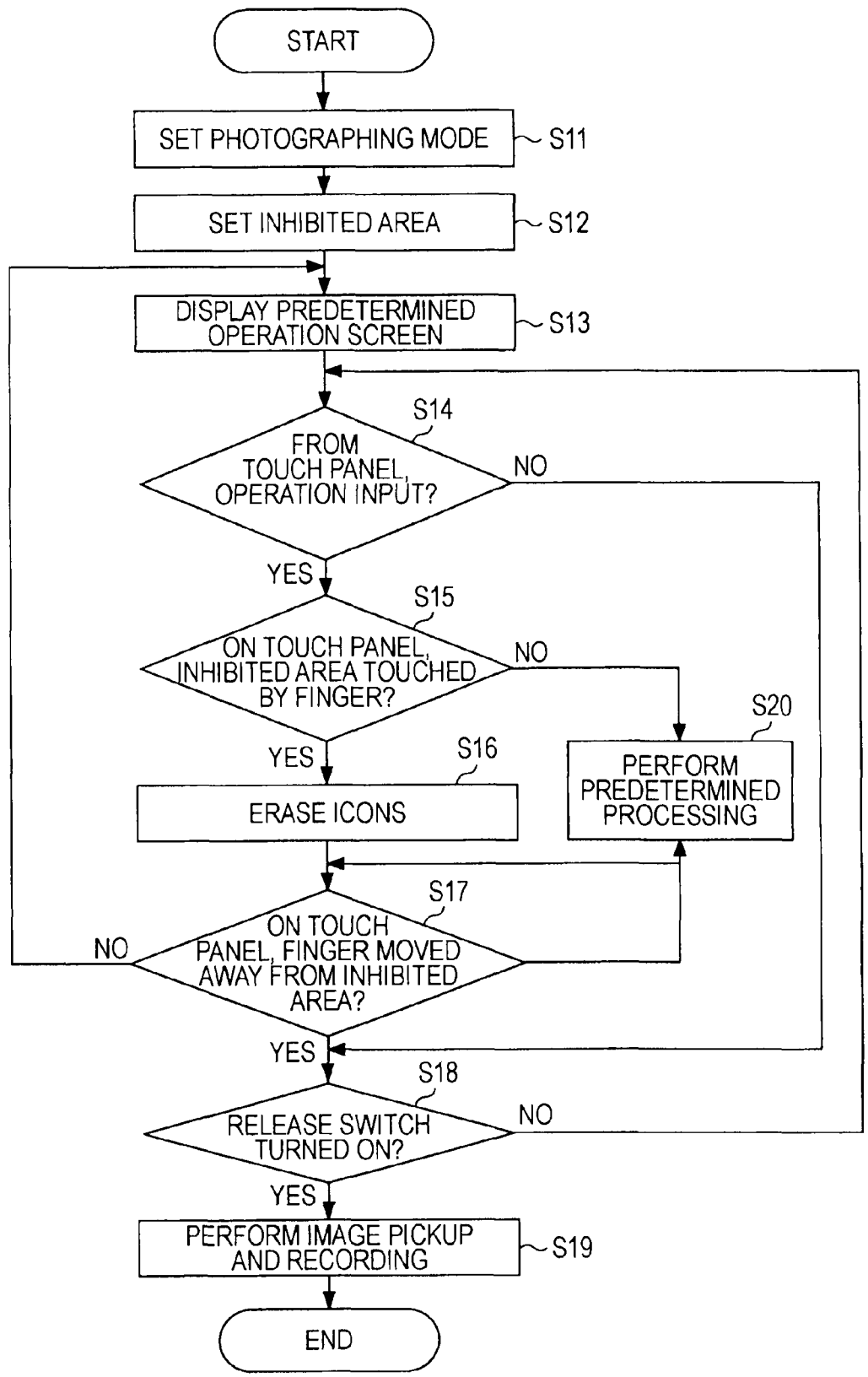
FIG. 5 is a detailed flowchart illustrating a characteristic process of the image pickup apparatus according to the second embodiment of the present invention.
Figure 6A:
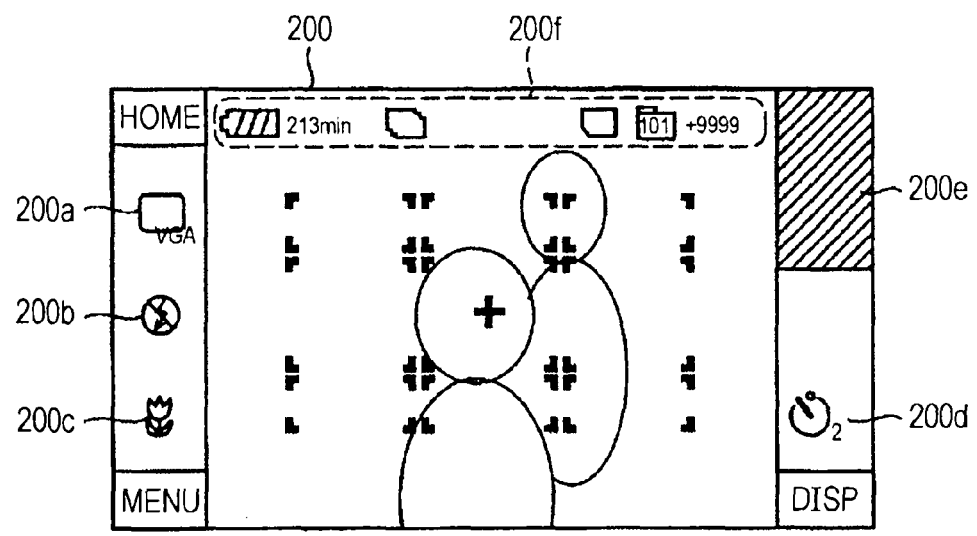
FIGS. 6A and 6B are illustrations of display examples of a touch screen of the image pickup apparatus according to the second embodiment of the present invention.
Figure 6B:
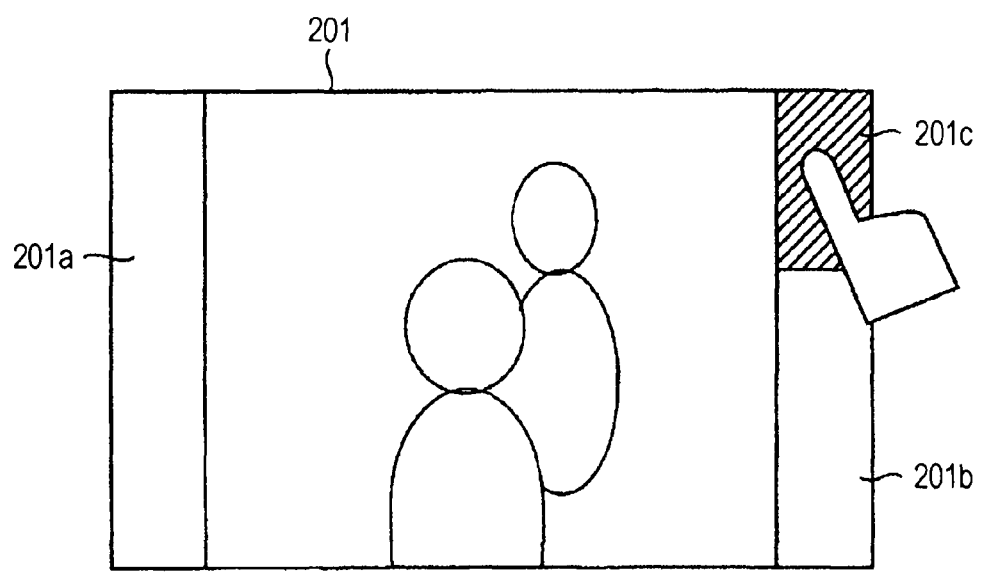

A characteristic process of the image pickup apparatus according to the second embodiment of the present invention will be described below in detail with reference to the flowchart shown in FIG. 5. Here, FIGS. 6A and 6B are referred to, if necessary. The following example process corresponds to an image display method according to the second embodiment.

When a photographing mode is set (step S11) in such a manner that an icon on the touch panel 16 is tapped, the CPU 23 sets an inhibited area on the basis of the set photographing mode (step S12). For example, in this image pickup apparatus, a desired size can be selected from among the photographing image sizes "16:9" (1920×1080 pixels), "4:3" (2592×1944 pixels), "3:2" (3264×2448 pixels), etc. Considering that the display form of a through-the-lens-image of a picked-up image differs according to each mode, the inhibited area can be set on the basis of each size. After the inhibited area is set in the above manner, the CPU 23 displays a predetermined operation screen on the touch screen 18 (step S13).

The displayed operation screen, that is, an operation screen 200, is as shown in FIG. 6A. On the operation screen 200, icons 200a to 200d for directing various operations are displayed. In addition, a touch panel region corresponding to a region 200e of the operation screen 200 is set as an inhibited area.

Specifically, the icon 200a represents an image size setting. In particular, with the icon 200a, a still image size can be selected from among "8M" (3264×2448 pixels), "3:2" (3264×2176 pixels), "5M" (2592×1944 pixels), "3M" (2048×1536 pixels), "VGA" (640×480 pixels), "16:9" (1920×1080 pixels), etc. The icon 200b relates to flash mode setting. The icon 200c relates to setting of a macro/super-macro mode. The icon 200d relates to self-timer setting. For brevity of description, only some icons are shown. Accordingly, obviously, actually used icons are not limited to the shown icons.

At the position of the icon 200a, an icon concerning moving image size selection can be displayed although the icon is not shown. In this case, a moving image size can be selected from among the moving image sizes, "Fine" (640×480 pixels; approximately 30 frames/second), "Standard" (640×480 pixels; approximately 17 frames/second), "Presentation" (320×240 pixels; approximately 8 frames/second), etc.

Next, in step S14, the CPU 23 determines whether or not an operation has been input via the touch panel 16. If, in step S14, the CPU 23 has determined that the operation has not been input, the CPU 23 is on standby until an operation is input. Alternatively, if, in step S14, the CPU 23 has determined that the operation has been input, in step S15, the CPU 23 determines whether or not the operation has been input in such a manner that the inhibited area on the touch panel 16 is touched by a finger.

If, in step S15, the CPU 23 has determined that the operation has been input in such a manner that the inhibited area on the touch panel 16 is touched by the finger, that is, that the operation input is an unintended operation input in such a manner that the inhibited area (for example, corresponding to the region 200e on the screen 200) is touched by the finger ("YES" in step S15), in step S16, the CPU 23 erases the icons displayed on the touch screen 18. In other words, in this case, as shown in FIG. 6B, all icons in icon display regions 201a and 201b are erased since, on a screen 201, an unintended operation has been input in such a manner that a region 201c as an inhibited area is touched by a finger. In addition, the icons 200f, shown in FIG. 6A, concerning various settings and situations, are erased together.

If the operation is not an unintended operation input in such a manner that the inhibited area 201c is touched by the finger ("NO" in step S15), in step S20, the CPU 23 performs predetermined processing and proceeds to step S17. In step S17, the CPU 23 determines whether the finger has moved away from the inhibited area 201c. The CPU 23 is on standby until the unintended input operation is not detected, that is, for example, until the user's finger moves away from the inhibited area 201c. After that, if the CPU 23 has determined that the finger has moved away from the inhibited area 201c ("YES" in step S17), in step S18, the CPU 23 determines whether or not a release switch that is included in the operation unit 24 has been turned on.

Here, if the CPU 23 has determined that the release switch has been turned on ("YES" in step S18), in step S19, the CPU 23 performs image pickup and recording, and finishes the process. At this time, needless to say, after predetermined image processing, or compression encoding such as JPEG processing, is performed on an image signal generated by image pickup, the processed signal is recorded in the recording device 19.

Alternatively, if the CPU 23 has determined that the release switch that is included in the operation unit 24 has not been turned on ("NO" in step S18), the CPU 23 returns to step S13 and repeats the above-described processing.

This image pickup apparatus can be set to a "Spot AF mode".

Figure 7A:
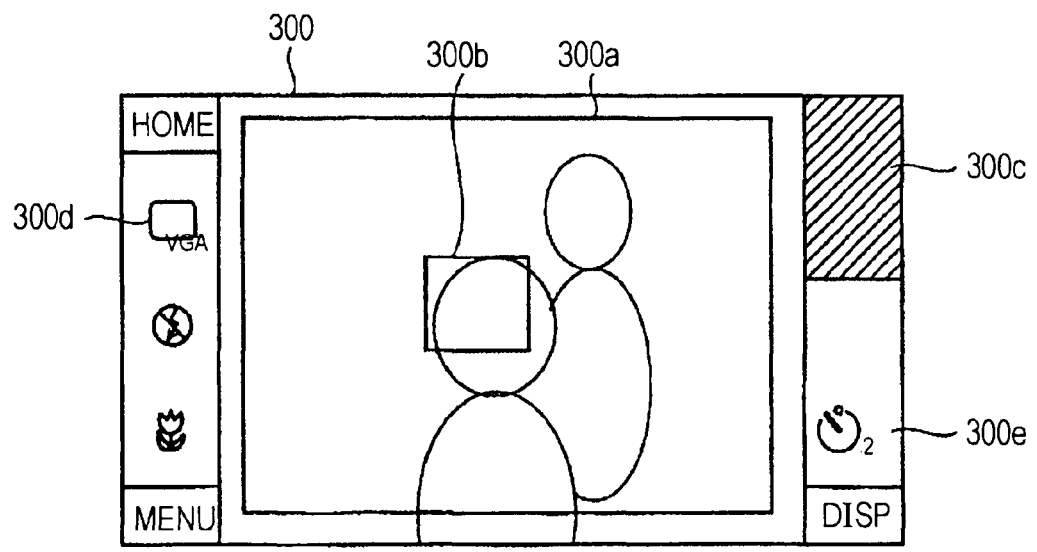
FIGS. 7A and 7B are illustrations of different display examples of the touch screen of the image pickup apparatus according to the second embodiment of the present invention.
Figure 7B:
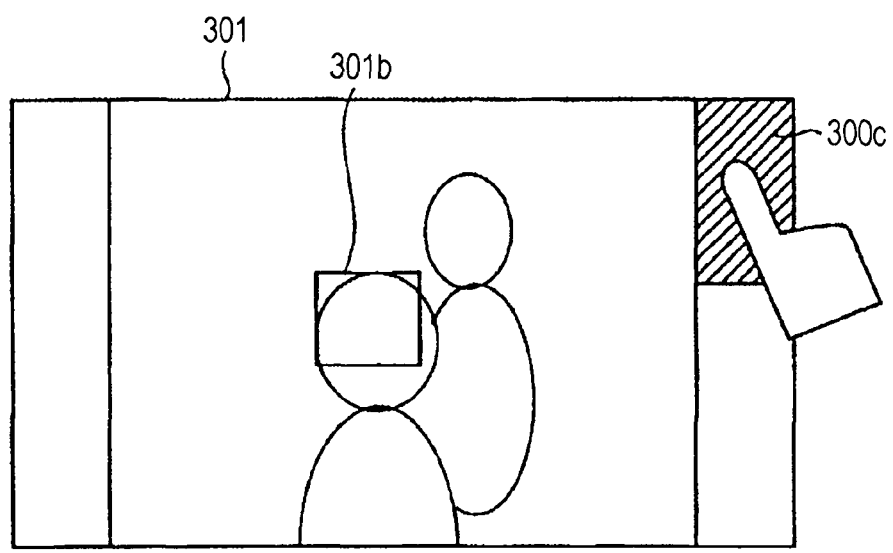

In the Spot AF mode, in a predetermined AF detection region, a desired AF point can be manually set. When the image pickup apparatus is set to the Spot AF mode, as shown in FIG. 7A, in a screen 300, an AF detection frame 300a and an AF frame 300b indicating a default AF point are displayed. Even if an unintended input has been performed from the touch panel 16 in such a manner that an inhibited area 300c is touched by a finger, as shown in FIG. 7B, only an AF frame 301b indicating an AF point is displayed.

This is because, when the release button that is included in the operation unit 24 is depressed even in such a situation, a photographing operation is made preferentially executable so that a photo opportunity is not missed. If the AF frame 301b is not displayed in this case, the user is unable to recognize which point is to be in focus. In this case, the inhibited area can be set within a range that does not reach the AF detection frame 300a so that the inhibited area is out of the icon display regions 300d and 300e.

Figure 8:
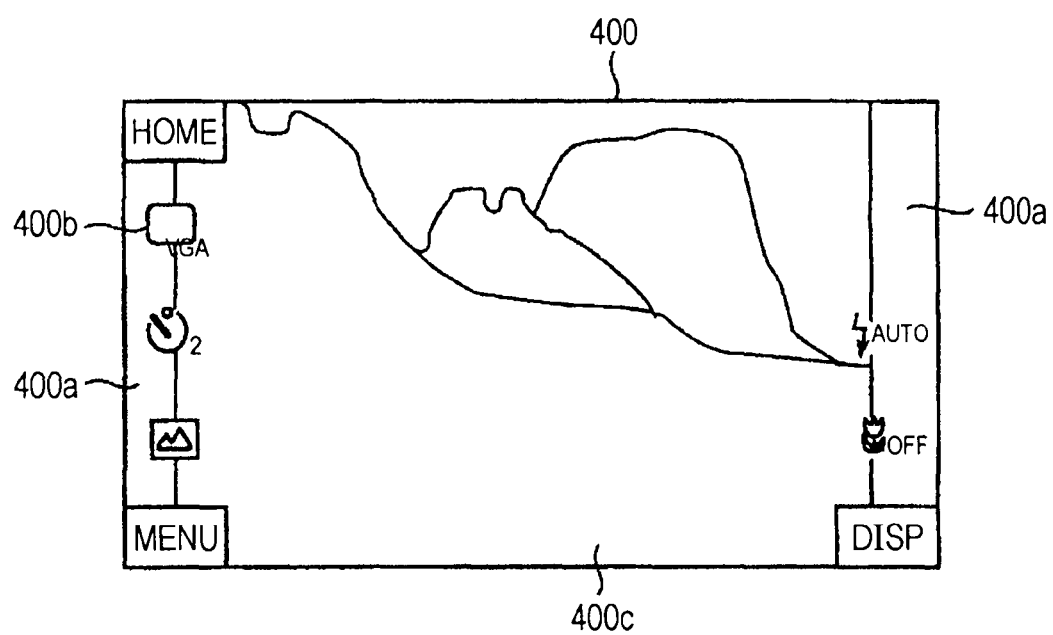
FIG. 8 is an illustration of a different display example of the touch screen of the image pickup apparatus according to the second embodiment of the present invention.

In addition, when the image size "3:2" is selected, as shown in, for example, FIG. 8, icon display regions 400a in a screen 400 are set, and an inhibited area may be accordingly set. In other words, in this case, a plurality of icons 400b are displayed outside the icon display regions 400a, crossing a part of a picked-up image display region 400c. The inhibited area may be set in an upper portion of the right icon display region 400a, the portion having a width of the right icon display region 400a in a horizontal direction of the screen. Also, the inhibited area may be set in a predetermined rectangular range in a top right portion of the screen 400, crossing a part of the picked-up image display region 400c.

As described above, according to the first and second embodiments, an image display device, an image pickup apparatus, an image display method, and a program can be provided in which, by erasing displayed icons in a situation in which an unintended operation has been input in such a manner that a user's finger touches an inhibited area of a touch panel or the like as an operation input unit, a user is allowed to recognize the situation.

Although the embodiments of the present invention have been described, the present invention is not limited thereto and may be variously improved and altered without departing the sprit and scope thereof.

For example, in the foregoing embodiments, in a relationship with the shutter button 52, a top right portion of the touch panel 16 which is most likely to be touched by a finger is set as an inhibited area. However, the inhibited area is not limited thereto. An area that has a high possibility that an unintended operation may be input can be set as the inhibited area. In addition, the inhibited area is not limited to a single location. Instead, a plurality of locations may be set as inhibited areas.

In addition, on the basis of initial setting performed by the user, any location on the touch panel 16 can be set as an inhibited area. Further, the existence of the inhibited area may be displayed on the liquid crystal panel 17 at the time the power is turned on and at the time an initial screen is displayed.

It should be understood by those skilled in the art that various modifications, combinations, sub-combinations and alterations may occur depending on design requirements and other factors insofar as they are within the scope of the appended claims or the equivalents thereof.

What is claimed is:

1. An image display device comprising:
a display unit configured to display at least an image and a plurality of icons each relating to a different predetermined setting;
a touch panel configured to receive an input operation, and on which a predetermined inhibited area is set; and
a control unit configured to perform control so that, when an operation is received at the touch panel, the control unit determines whether the operation was received within the predetermined inhibited area, and, when the operation was received within the predetermined inhibited area, the control unit controls the display to remove at least one of the plurality of icons displayed outside of the predetermined inhibited area.

2. The image display device according to claim 1, wherein the predetermined inhibited area corresponds to region surrounding at least one of the plurality of icons.

3. The image display device according to claim 2, wherein the control unit is configured to control the display to remove the at least one of the plurality of icons surrounded by the predetermined inhibited area upon determining that the operation was received within the predetermined inhibited area.

4. The image display device according to claim 2, wherein the control unit is configured to control the display to remove the predetermined inhibited area upon determining that the operation was received within the predetermined inhibited area.

5. The image display device according to claim 1, wherein the predetermined inhibited area corresponds to a bar-shaped region surrounding a plurality of the icons.

6. The image display device according to claim 5, wherein the control unit is configured to control the display to remove the plurality of icons surrounded by the bar-shaped predetermined inhibited area upon determining that the operation was received within the bar-shaped predetermined inhibited area.

7. The image display device according to claim 5, wherein the control unit is configured to control the display to remove the bar-shaped predetermined inhibited area upon determining that the operation was received within the bar-shaped predetermined inhibited area.

8. The image display device according to claim 1, wherein the image display device is a digital camera.

9. The image display device according to claim 8, wherein the plurality of icons each correspond to at least one of a still image size setting, a flash mode setting and a self timer setting.

10. An image display method comprising:
displaying at least an image and a plurality of icons each relating to a different predetermined setting;
performing control so that, after an inhibited area is set on a touch panel display and an operation is received at the touch panel, determining whether the operation was received within the predetermined inhibited area, and, when the operation was received within the predetermined inhibited area, removing at least one of the plurality of icons displayed outside of the predetermined inhibited area.

11. The image display method of claim 10, wherein
the predetermined inhibited area corresponds to a region surrounding at least one of the plurality of icons.

12. The image display method according to claim 11, wherein
performing control includes removing the at least one of the plurality of icons surrounded by the predetermined inhibited area upon determining that the operation was received within the predetermined inhibited area.

13. The image display method according to claim 11, wherein
performing control includes removing the predetermined inhibited area upon determining that the operation was received within the predetermined inhibited area.

14. The image display method according to claim 10, wherein
the predetermined inhibited area corresponds to a bar-shaped region surrounding a plurality of the icons.

15. The image display method according to claim 14, wherein
performing control includes removing the plurality of icons surrounded by the bar-shaped predetermined inhibited area upon determining that the operation was received within the bar-shaped predetermined inhibited area.

16. The image display method according to claim 14, wherein
performing control includes removing the bar-shaped predetermined inhibited area upon determining that the operation was received within the bar-shaped predetermined inhibited area.

17. The image display method according to claim 10, wherein
the image display device is a digital camera.

18. The image display method according to claim 17, wherein
the plurality of icons each correspond to at least one of a still image size setting, a flash mode setting and a self timer setting.

19. A non-transitory computer-readable medium including computer program instructions, which when executed by a processor of a digital camera, cause the digital camera to perform an image display method comprising:
displaying at least an image and a plurality of icons each relating to a different predetermined setting;
performing control so that, after an inhibited area is set on a touch panel display and an operation is received at the touch panel, determining whether the operation was received within the predetermined inhibited area, and, when the operation was received within the predetermined inhibited area, removing at least one of the plurality of icons displayed outside of the predetermined inhibited area.

* * * * *